United States Patent [19]

De Fazio

[11] 4,242,017
[45] Dec. 30, 1980

[54] PASSIVE MATING SYSTEM

[75] Inventor: Thomas L. De Fazio, Watertown, Mass.

[73] Assignee: The Charles Stark Draper Laboratory, Inc., Cambridge, Mass.

[21] Appl. No.: 63,184

[22] Filed: Aug. 3, 1979

[51] Int. Cl.³ ............................................. B23B 45/4
[52] U.S. Cl. .................................. 408/111; 33/169 C;
33/185 R
[58] Field of Search ...................... 408/75, 111, 81, 97,
408/80; 33/185 R, 169 C

[56] References Cited

U.S. PATENT DOCUMENTS

| | | | |
|---|---|---|---|
| 2,210,128 | 8/1940 | Rohr | 408/81 |
| 2,335,614 | 11/1943 | Spievak | 408/81 |
| 4,098,001 | 7/1978 | Watson | 33/169 C |
| 4,155,169 | 5/1979 | Drake et al. | 33/169 C |

Primary Examiner—Harry N. Haroian
Attorney, Agent, or Firm—Joseph S. Iandiorio

[57] ABSTRACT

A passive mating system for aligning and engaging a tool device with a workpiece including: a remote center compliance device; guide structure for movably supporting the tool device, the remote center compliance device having a remote center proximate the end of the guide structure; structure for supporting the remote center compliance device; and a feeding device for providing relative motion between the tool device and the guide structure in the remote compliance device, to advance and retract the tool device through the remote center compliance device.

13 Claims, 4 Drawing Figures

PASSIVE MATING SYSTEM

FIELD OF INVENTION

This invention relates to a passive mating system for aligning and engaging a tool device with a workpiece, and more particularly to such a system in which the tool device is operated through a remote center compliance device by independently supported drives.

BACKGROUND OF INVENTION

In many applications such as drilling, milling, routing, using machine tools, it is necessary to precisely align the tool, e.g. a rotary drill, with a workpiece. Typically this is done by precisely locating a drill jig with respect to a workpiece and then bringing a drill bushing into alignment with the jig. When the two are aligned the drill is advanced through the bushing and jig to the precise position on the workpiece to be drilled. This advancing of the drill is often accomplished by an active mechanical or electrical system or with human or robot assistance. The lateral and angular misalignments between jig and bushing are typically absorbed by the flexibility or adaptability of the person or robot or an automatic system or by mechanical structures with rotational centers at significant distances from the mating point at the end of the drill bushing. Often there can occur with such devices large forces and jamming at the interface of jig and bushing. In addition, there are instances wherein the not insubstantial weight of one or more of the motor drives for the drill rotation, the drill and holder, and even the feed drive, is supported by the compliance device; this added burden can shorten the life of the bushing and/or jig and interfere with the operation of the compliance device. In addition, such devices are best suited for use in the vertical and near vertical orientations.

SUMMARY OF THE INVENTION

It is therefore an object of this invention to provide an improved passive mating system for aligning and engaging a tool device with a workpiece.

It is a further object of this invention to provide such a system which guides and feeds the tool device along the axis of a remote center compliance device.

It is a further object of this invention to provide such a system which establishes a remote compliance center near the end of the guide or tool which is to align with a workpiece.

It is a further object of this invention to provide such a system which enables the tool feeding and/or tool driving apparatus to be supported independently of the remote center compliance device.

It is a further object of this invention to provide such a system which substantially reduces the weight borne by the compliance device and is operable in all orientations including horizontal.

The invention results from the realization that a particular effective passive mating system could be made by using a remote center compliance device to align with a workpiece, a guide, disposed along the axis of the remote center compliance device, through which the tool device is advanced and retracted while interconnected through a flexible shaft to a tool drive.

The invention features a mating system for aligning and engaging a tool device with a workpiece. There is a remote center compliance device and guide means for movably supporting the tool device. The remote center compliance device has a remote center proximate the end of the guide means, and there are means for supporting the remote center compliance device. Additional means provided relative motion between the tool device and the guide means in the remote center compliance device to advance and retract the tool device through the remote center compliance device.

In a preferred embodiment the guide means may be disposed along the axis of the remote center compliance device for axial relative motion between the guide means and tool device. The means for supporting may include a head member, a base member, and means for slidably interconnecting the members. The system may also include means for driving the tool device, and coupling means for flexibly interconnecting the tool device and the means for driving. The means for providing relative axial motion includes spring means for resiliently interconnecting the base and head members. Alternatively, it may include a feed cylinder, solenoid, or other active means for moving the tool device along its axis. The guide means may include a passage through the remote center compliance device, and a bearing member intermediate the tool device and passage. The bearing member may include slide bearing means for enabling axial relative motion between the remote center compliance device and tool device, and rotary bearing means for enabling rotary motion of the tool device. The means for driving may include a motor for rotating the tool device, and the coupling means may include a double universal joint mechanism. The tool device typically includes a tool holder which enagages a tool, and the guide means may include a tool bushing at its outer end which engages a tool jig properly located with respect to the workpiece to be addressed.

DISCLOSURE OF PREFERRED EMBODIMENT

Other objects, features and advantages will occur from the following description of a preferred embodiment and the accompanying drawings, in which.

Figure 1:
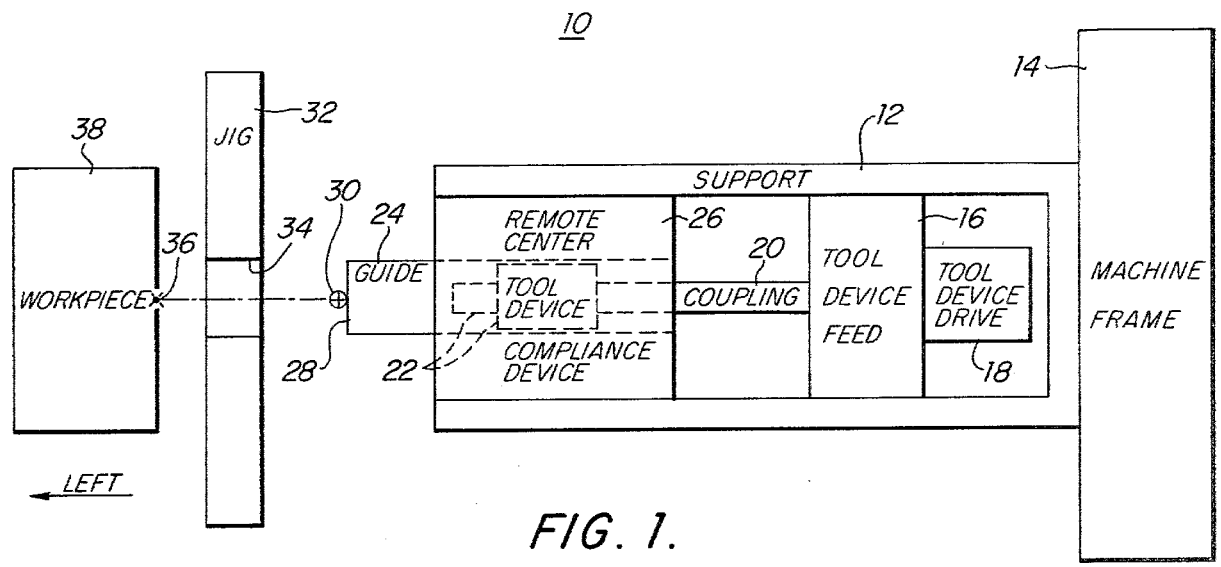
FIG. 1 is a block diagram of a passive mating system according to this invention.

The invention may be accomplished with a passive mating system that aligns and engages a tool such as a drill with a workpiece. Typically the tool device includes a tool, such as a drill, and a holder for the tool, such as a chunk. Typically the drill is rotated by a motor which is coupled to the tool by some flexible interconnection device. This may be a double universal joint mechanisn, for example, or a cable-like shaft, provided it is rigid enough in the axial direction to permit the necessary axial force to be transmitted through it to the tool device. There is a remote center compliance device such as described in U.S. Pat. No. 4,098,001, "Remote Center Compliance System", Paul C. Watson, and No. 4,155,169, "Compliant Assembly System Device", Drake et al, which are incorporated herein by reference. Guide means are located in the remote center compliance device along its axis. The guide means support the tool device and allow it to slide back and forth along the axis of the remote center compliance device and also be rotated by the means of driving, for example a motor. The guide means typically includes a passage in the remote center compliance device and some bearing means which may include both sliding and rotary bearings, and is fixed to the compliant end of the remote center compliance device. The guide means may also include a bushing or other device at its free end. The remote center compliance device produces a remote center proximate the end of the guide means in order to facilitate a quick and effortless alignment of the tool device or the end of the guide means with the workpiece. There are means for supporting the remote center compliance device and the means for driving: the means for supporting is typically a structure which is supported by the frame of the machine that carries the passive mating system. Some means such as a feed cylinder, solenoid, spring mechanism or other actuator provides relative axial motion between the tool device and the guide means in the remote center compliance device in order to advance and retract the tool device through the remote center compliance device. The means for supporting may include a single unitary structure or a head member, a base member, and means for slidably interconnecting the members. For example, the means for slidably interconnecting the members may be bores or channels on one member which engage with pins on the other, for example by tensing and extending a spring which resiliently engages the base and head members. In that case, the means for providing relative axial motion may include the spring which is resiliently positioned between the base and head members. Alternatively, the means for providing relative axial motion may include a feed cylinder or solenoid or other actuator which moves the tool device back and forth along its axis. The guide means may include a tool bushing for engagement with a tool jig which establishes proper alignment between the tool and the workpiece. When the guide means includes a tool bushing or other device, the remote center is proximate the end of that bushing or device insofar as it is a part of the guide means. For example, the remote center may be established near the end of the tool held by the tool device, or near the end of a part engaged by the tool held by the tool device. The remote center simply is located near the end of the guide means, however constituted, which is to be centered or located with respect to another part. The system as illustrated generally possesses cylindrical symmetry.

There is shown in FIG. 1 a passive mating system 10 according to this invention which includes support 12, that may be carried on a conventional machine tool frame 14. Support 12 supports tool device feed 16; tool device drive 18, through coupling 20, drives tool device 22 shown presently housed in guide 24, which is fixed to the compliance portion of remote center compliance device 26. When tool device feed 16 is actuated, tool device drive 18 along with coupling 20 may be moved to the left so that the tool associated with tool device 22 extends beyond the end 28 of guide 24. Remote center compliance device 26 establishes a remote center 30 either at the end of guide 24 or just beyond it, as explained in U.S. Pat. Nos. 4,098,001 and 4,155,169. Jig 32 contains a bore 34 sized to receive the end of guide 24 and precisely aligned with the spot 36 on workpiece 38 with which the tool of tool device 22 is to engage.

In operation, system 10 is moved to the left, carried by machine frame 14, until the end 28 of guide 24, acting as a drill bushing, is centered by the action of remote center compliance device 26 in hole 34 of jig 32. Tool device feed 16 is then actuated to advance tool device 22 to the left so that the tip of the tool engages workpiece 38 at position 36. Tool device drive 18 powers tool device 22 so that the tool drills or otherwise performs its action.

Figure 2:
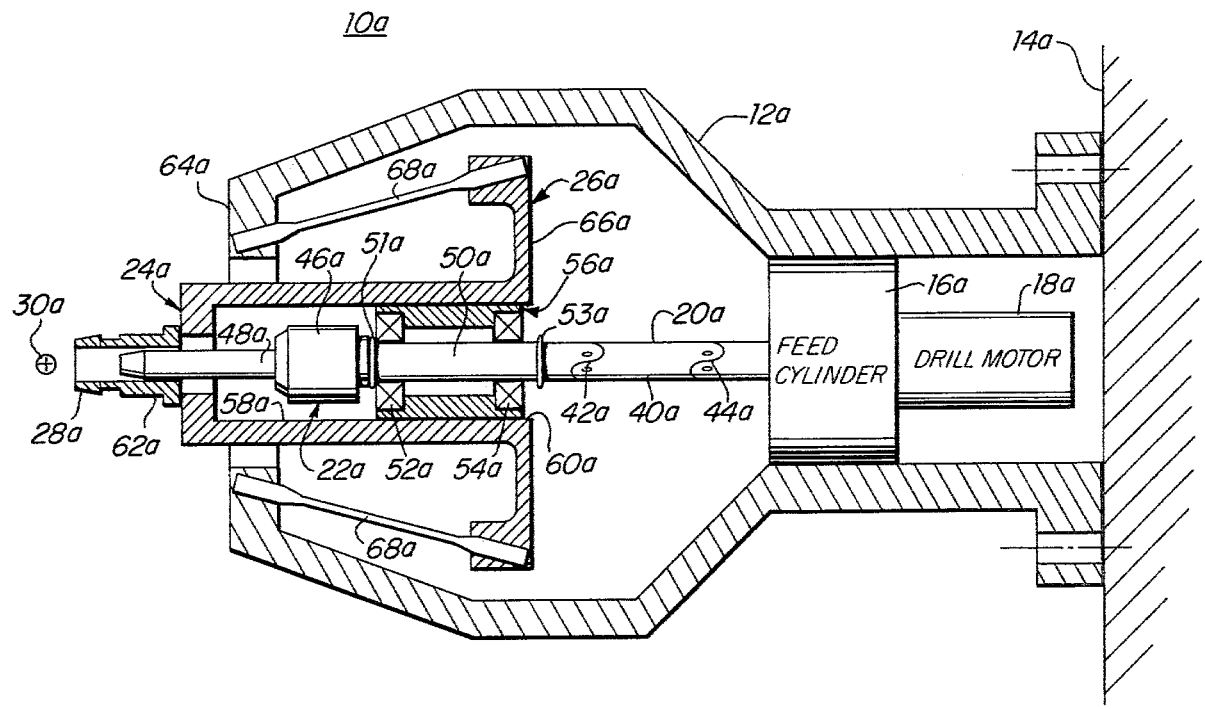
FIG. 2 is a diagrammatic view, partially in cross-section, of one embodiment of the invention.

In one embodiment, where like parts have been given like numbers accompanied by a lower case "a", a system 10a, FIG. 2, includes a support structure or nosepiece 12a which is fixed to machine frame 14a. Coupling 20a includes a shaft 40a with double universal joints 42a and 44a, driven by drill motor 18a attached to a movable member in feed cylinder 16a driven to and fro to advance and retract tool device 22a. Tool device 22a includes a tool holder or chunk 46a and tool 48a, as well as shaft 50a, which is attached to coupling 20a and is rotatably supported in rotary bearings 52a, 54a of bearing member 56a, which forms part of guide 24a. Retainer rings 51a and 53a are provided to limit the motion of shaft 50a with respect to bearings 52a, 54a, and 56a, or to retain bearings 52a and 54a. Guide 24a also includes passage 58a in which bearing member 56a is slidably moveable on its cylindrical bearing surface 60a. Bushing 62a at the end of passage 58a may also be included in guide means 24a in some embodiments. Remote center compliance device 26a includes member 64a at the outer end of nosepiece 12a, interconnected by members 68a which result in the remote center 30a being at or near the end of bushing 62a or beyond it. Remote center compliance 26a is the type shown in U.S. Pat. No. 4,155,169. It includes a deformable portion 66a and three longitudinal beams 68a, the construction and operation of which is disclosed in U.S. Pat. No. 4,155,169. Guide means 24a are located in place of the operator member of that patent.

Although thus far the tool is shown as fed down the axis of the remote center compliance device, it is not necessary that the tool rotation axis be coincident with the axis of the remote center compliance device, nor need the rotational axis pass through the center of compliance of the remote center compliance device. The coupling device typically requires some flexible coupling shaft in the coupling between the tool device and the remote center compliance device in order to allow the drive means, such as a motor, to be mounted independently of the remote center compliance device. The shaft should be flexible enough laterally to allow operation even when the central axis of the tool device and the motor are not aligned, and yet be stiff enough axially to allow advancing and retracting of the tool device relative to the guide or bushing carried by the remote center compliance device as illustrated in FIG. 2. Two different means could be used, for example one shaft for the rotation of the tool device and another shaft for the movement of it back and forth along the axis of the remote center compliance device. The bearing device permits both rotary and sliding motion and may include both functions in a single unit or a number of parts.

Figure 3:
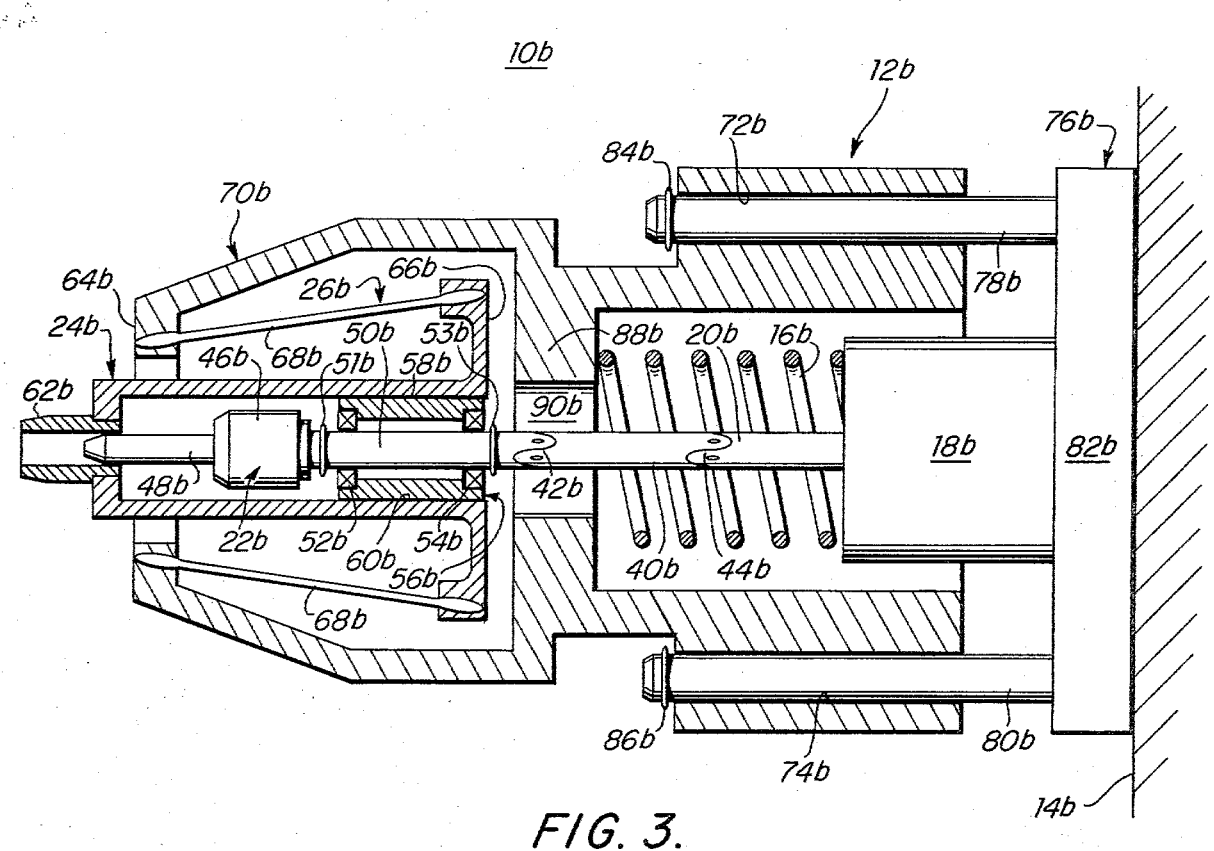
FIG. 3 is a diagrammatic view with portions shown in cross-section of an alternative embodiment of the invention.

In an alternative embodiment, where like parts have been given like numbers accompanied by a lower case b, system 10b, FIG. 3, the support or nosepiece 12b includes head member 70b which includes channels 72b, 74b and a base member 76b which includes pins 78b, 80b, mounted on plate 82b and slidably engaged with channels 72b and 74b, respectively. Retainer rings 84b and 86b are used to limit the movement of head member 70b on pins 78b and 80b. Although only two channels and two pins are shown in FIG. 3, typically three or more would be used for stability. Head member 70b also includes a section 88b having a hole 90b therethrough to accommodate coupling means 20b. Feed cylinder 16a is absent in FIG. 3 and has been replaced by spring 16b which operates in conjunction with pins 78b and 80b and channels 72b and 74b, to provide relative motion between the tool device 22b and the remote center compliance device 26b. This occurs when in operation bushing 62b and guide means 24b come into contact with a jig. At that point, as base member 82b, driven by machine frame 14b, continues to advance to the left as shown in FIG. 3, spring 16b becomes compressed and head 70b slides to the right on pins 78b and 80b. This causes remote center compliance device 26b to be moved to the right and to translate relative to tool device 22b so that tool 48b extends beyond the end of bushing 62b to engage the workpiece.

Figure 4:
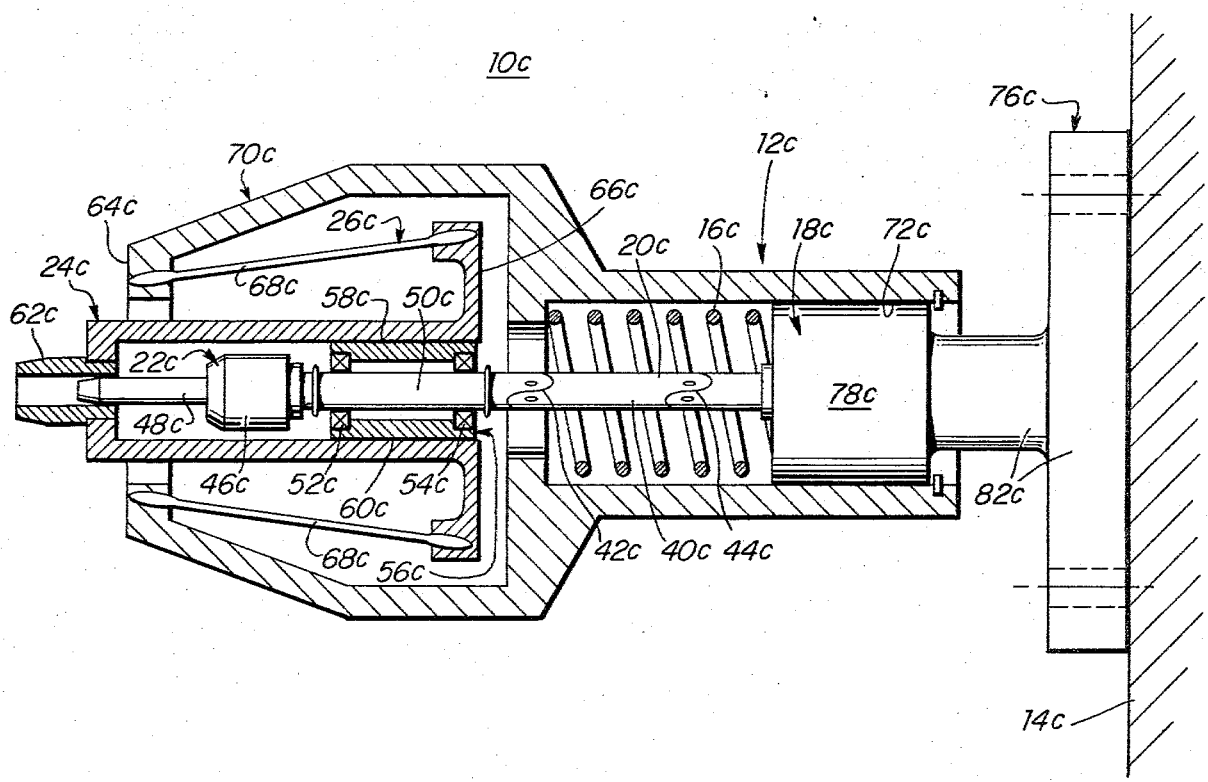
FIG. 4 is a diagrammatic view with parts in cross-section of another form of the embodiment shown in FIG. 3.

In another construction similar to that shown in FIG. 3, system 10c, FIG. 4, where like parts have been given like numbers accompanied by a lower case c, motor 18c is encased in a bearing cylinder 78c which functions similarly to pins 78b and 80b in FIG. 3. Bearing cylinder 78c is supported by base member 82c and slidingly supports the head member 70c in sliding engagement with inner surface 72c. Motor 18c is mounted within cylindrical bearing surface 78c. System 10c operates in the same manner as system 10b, that is, after bushing 62c engages and is stopped by the jig, further motion of base member 82c causes compression of spring 16c and translational relative motion between the tool device 22c and the remote center compliance device 26c, so that drill 48c exits the end of bushing 62c and engages with the workpiece.

Other embodiments will occur to those skilled in the art and are within the following claims:

What is claimed is:

1. A passive mating system for aligning and engaging a tool device with a workpiece, comprising:
    a remote center compliance device;
    means for supporting said remote center compliance device;
    guide means carried by said remote center compliance device for movably supporting said tool device, said remote center compliance device having a remote center proximate the end of said guide means; and
    means for providing relative motion between the tool device and said guide means to advance and retract said tool device.

2. The mating system of claim 1 in which said means for supporting includes a head member, a base member, and means for slidably interconnecting said members.

3. The mating system of claim 1 further including means for driving said tool device and coupling means for flexibly interconnecting said tool device and said means for driving.

4. The mating system of claim 2 in which said means for providing relative motion includes spring means resiliently engaging said head and base members.

5. The mating system of claim 1 in which said means for providing relative motion includes a feed cylinder for moving said tool device along its axis.

6. The mating system of clim 1 in which said guide means includes a passage through said remote center compliance device and a bearing member intermediate said tool device and said passage.

7. The mating system of claim 6 in which said bearing member includes slide bearing means for enabling axial relative motion between said remote center compliance device and said tool device.

8. The mating system of claim 6 in which said bearing member includes rotatably bearing means for enabling rotary motion of said tool device.

9. The mating system of claim 1 in which said means for driving includes a motor for rotating said tool device.

10. The mating system of claim 1 in which said means for driving includes a double universal joint mechanism.

11. The mating system of claim 1 in which said tool device includes a tool holder.

12. The mating system of claim 1 in which said tool device includes a tool engaged by said tool holder.

13. The mating system of claim 1 in which said guide means includes a tool bushing for engaging a tool jig.

* * * * *